United States Patent Office 2,837,543
Patented June 3, 1958

2,837,543
PREGNENE-1-THIOL ESTERS AND PREPARATION THEREOF

Raymond M. Dodson, Park Ridge, and Robert C. Tweit, Wilmette, Ill., assignors to G. D. Searle & Co., Chicago, Ill., a corporation of Delaware No Drawing. Application October 22, 1956
Serial No. 617,277

10 Claims. (Cl. 260—397.45)

The present invention relates to steroidal mercaptans, and more particularly to acyl derivatives thereof. The compositions of this invention can be represented by the general structural formula

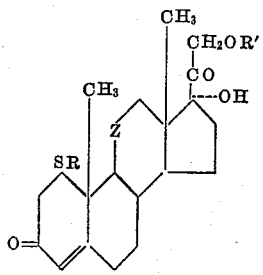

in which formula R represents a lower alkanoyl radical, R' can represent hydrogen or a lower alkanoyl radical, and Z can represent a carbonyl (CO) radical or a hydroxymethylene (CHOH) radical. Among the lower alkanoyl radicals comprehended herein are formyl, acetyl, propionyl, butyryl, valeryl, hexanoyl, heptanoyl, octanoyl, and branched-chain isomers thereof, said alkanoyl radicals being the acyl radicals of alkanoic acids containing fewer than 9 carbon atoms.

Compositions of the present invention can be prepared by the addition of a thioalkanoic acid of the structural formula

R"COSH wherein R" is a lower alkyl radical, to a pregnadiene derivative of the structural formula

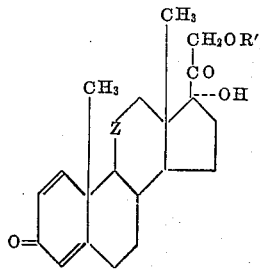

wherein R' and Z are defined as hereinbefore. The addition reaction proceeds fairly rapidly at elevated temperatures, such as those in excess of 50° C., and can optionally be carried out under the influence of ultraviolet light. In preferred embodiments of this invention, wherein the thioalkanoic acid employed is thioacetic acid, substantially complete addition to the 1-double bond is achieved by carrying out the reaction at the reflux temperature of thioacetic acid and under the influence of ultraviolet light for periods of time less than 2 hours. In the particular situation of small scale applications, the heat effect of the ultraviolet light can be sufficient to maintain the reaction mixture under reflux. When the compound desired is one having an esterified hydroxyl group at position 21, it is suitable to employ as starting material the corresponding 21-mono ester of the 11-oxygenated-17α,21-dihydroxy-1,4-pregnadiene-3,20-dione; or alternatively, to carry out the addition reaction on the derivative having a free 21-hydroxyl group, and subsequently to complete the partial acylation effected by the thioalkanoic acid by adding pyridine and a lower alkanoic acid anhydride to the reaction mixture prior to the isolation of product.

When the final product desired is one having a free 21-hydroxyl group, it can be obtained by the treatment of the corresponding 11-oxygenated 17α,21-dihydroxy-1,4-pregnadiene-3,20-dione, suitably in an inert solvent, with only 1 molecular equivalent of the thioalkanoic acid. It can also be obtained by treating the free 21-hydroxyl-1,4-pregnadiene derivative with an excess of the thioalkanoic acid, but under milder conditions, such as by the use of a shorter reaction time as described more fully hereinafter, under which circumstances there occurs substantially complete addition of the thioalkanoic acid to the 1-double bond, with restricted formation of the acylated product at position 21. The quantity of 21-ester which does form by the acylating action of the thioalkanoic acid is then removed by chromatography.

The free mercaptans, such as 17α,21-dihydroxy-3,11,20-trioxo-4-pregene-1-thiol and its 21-esters, and 11β,17α,21-trihydroxy-3,20-dioxo-4-pregnene-1-thiol and its 21-esters, can be obtained by the addition of hydrogen sulfide to the corresponding 1,4-pregnadiene derivatives, suitably in a solvent comprising pyridine and a catalytic amount of piperidine. The free mercaptans can also be obtained by the mild hydrolysis of the acylthio derivatives.

The addition of thioalkanoic acids to the 1,4-pregnadiene derivatives comprehended herein as starting materials proceeds under steric influences such that of the stereoisomers formed, one is obtained in predominant amount. The isomer obtained in predominant amount has in each case been characterized herein as possessing the α configuration of the 1-acylthio group. This configuration has been designated in order to provide a more complete exposition of the present invention, and in order that the specification shall constitute a more useful contribution to the art. However, the designated configuration of the 1-acylthio group is based upon an analysis of molecular rotation data presently appearing in the chemical literature, and is therefore not to be interpreted as one which is established beyond reasonable doubt. It will be apparent that no part of the specification will be materially defective if it should later be established that the configuration is the opposite of that deducible from data presently available to workers in the field.

The compounds of the present invention have useful pharmacological properties. They are hormonal agents of the adrenocorticoid type, and they are particularly noteworthy for their high anti-inflammatory activity. Specifically, they have been found useful in the treatment of inflammation of the iris, and because of their high potency they can be employed for this and other inflammatory conditions at dosage levels at which undesirable side actions are substantially reduced or absent.

By the application of procedures described generally in this disclosure to other steroidal dienes, other classes of valuable pharmacological and hormonal agents can be obtained. For example, the addition of thioalkanoic acids to 17α,21-dihydroxy-4,6-pregnadiene-3,11,20-trione and to its 21-esters affords a new series of anti-iritic and anti-inflammatory agents, namely, 7α-alkanoylthio-17α,21-dihydroxy-4-pregnene-3,11,20-triones and their 21-esters. Analogously, by employing as starting materials 11β,17α,21-trihydroxy-4,6-pregnadiene-3,20-dione and its 21-esters there are obtained 7α-alkanoylthio-11β,17α,21-trihydroxy-4-pregnene-3,20-diones and their 21-esters. 7-thiols corresponding to the foregoing compounds are obtained by mild hydrolysis.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

*Example 1*

A solution of 2 parts of 17α-hydroxy-21-acetoxy-1,4-pregnadiene-3,11,20-trione in 2 parts of thioacetic acid is heated under reflux and simultaneously irradiated with ultraviolet light for from 1 to 2 hours, and is then allowed to stand at room temperature for about 16 hours. A crystalline product which begins to form during the period of irradiation is increased in amount by removing some of the unreacted thioacetic acid by distillation in a vacuum. The crude, crystalline product is collected on a filter and washed with ether. By recrystallization from acetone there is obtained 1α-acetylthio-17α-hydroxy-21-acetoxy-4-pregnene-3,11,20-trione which melts at about 219–220° C. and has a specific rotation of about +190° in chloroform solution. The structural formula is

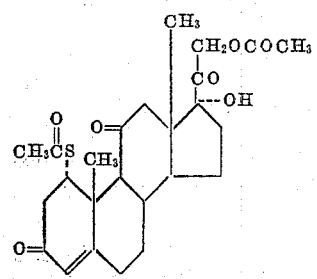

*Example 2*

A solution of 1 part of 17α,21-dihydroxy-1,4-pregnadiene-3,11,20-trione in 1.5 parts of thioacetic acid is heated under reflux and irradiated with ultraviolet light for 2 hours, and is then allowed to stand for 16 hours at room temperature. Pyridine (3 parts) and acetic anhydride (1 part) are then added, and the reaction mixture is maintained at room temperature for an additional 24 hours. It is then diluted with several times its volume of water, brought to neutrality by the addition of sodium bicarbonate, and extracted with several portions of methylene chloride. The combined methylene chloride extracts are washed with water and distilled to dryness under reduced pressure. A solution of the residue in a minimum quantity of benzene is poured on a chromatography column prepared from 85 parts of silica, and the column is eluted with benzene and with mixtures of benzene and ethyl acetate containing gradually increasing proportions of ethyl acetate. The desired product corresponds to the principal weight peak of the elution curve, and it can be eluted from the column at a satisfactory rate with a 20-volume percent solution of ethyl acetate in benzene. The crystalline residues corresponding to this weight peak are combined and purified by crystallizations from mixtures of acetone and ether, whereby there is obtained 1α-acetylthio-17α-hydroxy-21-acetoxy-4-pregnene-3,11,20-trione, identical with the product of Example 1.

*Example 3*

A solution of 5 parts of 17α,21-dihydroxy-1,4-pregnadiene-3,11,20-trione, 50 parts of pyridine and 40 parts of propionic anhydride is allowed to stand at about 25° C. for 24 hours, during which time a crystalline reaction product separates. The mixture is chilled and filtered, and the crystalline product is washed with ether. This compound is 17α-hydroxy-21-propionoxy-1,4-pregnadiene-3,11,20-trione which melts at about 238–242° C. and is suitable for use without further purification. An intimate mixture of 1 part of this compound and 1 part of thiopropionic acid is heated at about 90–100° C. and simultaneously irradiated with ultraviolet light for 2 hours. Almost all of the excess thiopropionic acid is then removed from the resulting solution by distillation under reduced pressure, and the crude reaction product is collected and washed with ether. By crystallization from a mixture of acetone and ether there is obtained 1α-propionylthio - 17α - hydroxy - 21 - propionoxy - 4 - pregnene-3,11,20-trione which melts at about 156–158° C. The structural formula is

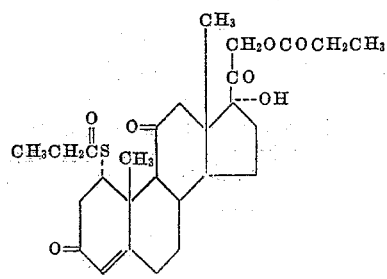

*Example 4*

A solution of 1 part of 17α,21-dihydroxy-1,4-pregnadiene-3,11,20-trione in 1.5 parts of thioacetic acid is heated under reflux and irradiated with ultra-violet light for 20 minutes. The mixture is then diluted with several times its volume of water, brought to neutrality by the addition of sodium bicarbonate, and extracted with several portions of methylene chloride. The combined methylene chloride extracts are washed with water and distilled to dryness under reduced pressure. A solution of the residue in a minimum quantity of benzene is poured on a chromatography column prepared from 85 parts of silica, and the column is eluted with benzene and with mixtures of benzene and ethyl acetate containing gradually increasing proportions of ethyl acetate. 1α-acetylthio-17α-hydroxy-21-acetoxy-4-pregnene-3,11,20-trione, identical with the product of Example 1, is removed by elution of the column with a 20 volume percent solution of ethyl acetate in benzene. After substantially all of this compound is removed, the column is eluted with a 40 volume percent solution of ethyl acetate in benzene, and the eluate residues of this solvent mixture corresponding to a weight peak of the elution curve are combined and purified by crystallization from a mixture of ethyl acetate and petroleum ether. The compound thus obtained is 1α-acetylthio-17α,21-dihydroxy-4-pregnene-3,11,20-trione which has an ultraviolet absorption maximum at 238.5 millimicrons. The structural formula is

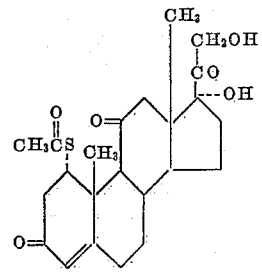

*Example 5*

A refluxing solution of 1 part of 11β,17α,21-trihydroxy-1,4-pregnadiene-3,20-dione in 1.5 parts of thioacetic acid is subjected to irradiation by an ultraviolet light source for 2 hours. It is allowed to stand at room temperature for an additional 16 hours, following which 3 parts of pyridine and 1 part of acetic anhydride are added. After it has stood for an additional 24 hours at room temperature, the mixture is diluted with several times its volume of water, neutralized with sodium bicarbonate, and extracted with several portions of methylene chloride. The combined methylene chloride extract is washed with water and distilled to dryness under reduced pressure. A solution of the residue in a minimum quantity of benzene is poured on a chromatography column prepared from 85 parts of silica, and the column is eluted with benzene and with mixtures of benzene and ethyl acetate containing gradually increasing proportions of ethyl acetate. After small amounts of impurities are removed from the column, suitably by elution with 5, 10, and 15 volume percent solutions of ethyl acetate in benzene, the desired compound is obtained. This compound corresponds to the principal weight peak of the elution curve, and is conveniently obtained by elution of the column with a 20 volume percent solution of ethyl acetate in benzene. Crystalline eluate residues corresponding to this weight peak are combined and recrystallized from mixtures of acetone and ether. In this manner there is obtained 1α-acetylthio-11β,17α-dihydroxy-21-acetoxy-4-pregnene-3,20-dione which melts at about 212–213° C. and has a specific rotation of about +191° in chloroform solution. The structural formula is

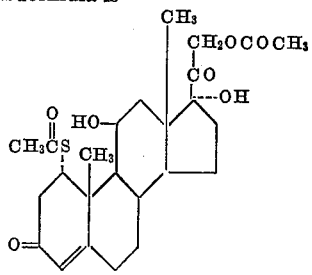

Example 6

A refluxing solution of 1 part of 11β,17α,21-trihydroxy-1,4-pregnadiene-3,20-dione in 2 parts of thioacetic acid is subjected to irradiation by an ultraviolet light source for 20 minutes. The cooled mixture is then diluted with several times its volume of water, neutralized with sodium bicarbonate, and extracted with several portions of methylene chloride. The combined methylene chloride extract is washed with water and distilled to dryness under reduced pressure. A solution of the residue in a minimum quantity of benzene is poured on a chromatography column prepared from 85 parts of silica, and the column is eluted with benzene and with mixtures of benzene and ethyl acetate containing gradually increasing proportions of ethyl acetate. After small amounts of impurities are removed by elution with relatively less polar mixtures of benzene and ethyl acetate, elution with a 20 volume percent solution of ethyl acetate in benzene affords fractions which, after crystallizations from mixtures of acetone and ether, yield 1α-acetylthio-11β,17α-dihydroxy-21-acetoxy-4-pregnene-3,20-dione, identical with the product of Example 5. Following the removal of this compound, the column is eluted with portions of a 40 volume percent solution of ethyl acetate in benzene, and eluate residues corresponding to the principal weight peak obtained by elution with this solvent mixture are combined and crystallized from a mixture of ethyl acetate and petroleum ether. The compound thus obtained is 1α-acetylthio-11β,17α,21-trihydroxy-4-pregnene - 3,20 - dione which has an ultraviolet absorption maximum at 241.5 millimicrons. The structural formula is

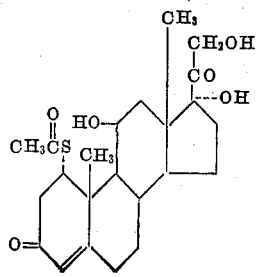

Example 7

A solution of 2 parts of 17α-hydroxy-21-acetoxy-4,6-pregnadiene-3,11,20-trione in 2 parts of thioacetic acid is heated under reflux and irradiated with ultraviolet light for 2 hours. The solid product which results is collected on a filter and washed with ether. This product is dissolved in a minimum quantity of methylene chloride, and recrystallized by adding 20 parts of methanol and concentrating the resulting solution. The compound thus obtained is 7α-acetylthio-17α-hydroxy-21-acetoxy-4-pregnene-3,11,20-trione which melts at about 234–235° C., has an ultraviolet absorption maximum at 235.5 millimicrons with a molecular extinction coefficient of about 16,850, and has a specific rotation of about +102.5° in chloroform solution. The structural formula is

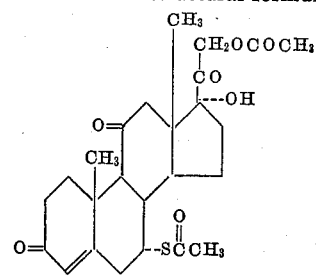

What is claimed is:

1. A compound of the structural formula

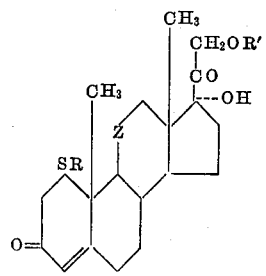

wherein R is a lower alkanoyl radical; R' is a member of the group consisting of hydrogen and lower alkanoyl radicals; and Z is a member of the group consisting of carbonyl and hydroxymethylene radicals.

2. 1α - (lower)alkanoylthio - 17α-hydroxy-21-(lower)-alkanoyloxy-4-pregnene-3,11,20-trione.

3. 1α - acetylthio - 17α-hydroxy-21-acetoxy-4-pregnene-3,11,20-trione.

4. 1α - (lower)alkanoylthio - 17α,21-dihydroxy-4-pregnene-3,11,20-trione.

5. 1α - acetylthio-17α,21-dihydroxy-4-pregnene-3,11,20-trione.

6. 1α - (lower)alkanoylthio - 11β,17α-dihydroxy-21-(lower)alkanoyloxy-4-pregnene-3,20-dione.

7. 1α - acetylthio - 11β,17α-dihydroxy-21-acetoxy-4-pregnene-3,20-dione.

8. 1α - (lower)alkanoylthio - 11β,17α,21-trihydroxy-4-pregnene-3,20-dione.

9. 1α - acetylthio - 11β,17α,21-trihydroxy-4-pregnene-3,20-dione.

10. A process which comprises reacting a compound of the structural formula

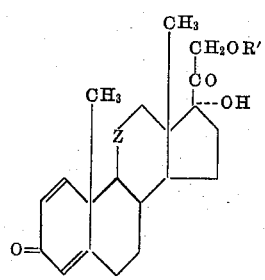

with a thio acid of the structural formula

R″COSH and isolating a compound of the structural formula
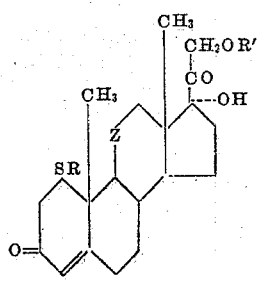
in which formulas R is a lower alkanoyl radical; R' is a member of the group consisting of hydrogen and lower alkanoyl radicals; R'' is lower alkyl and Z is a member of the group consisting of carbonyl and hydroxymethylene radicals.
References Cited in the file of this patent
UNITED STATES PATENTS
2,737,518  Herzog ---------------- Mar. 6, 1956